March 1, 1966

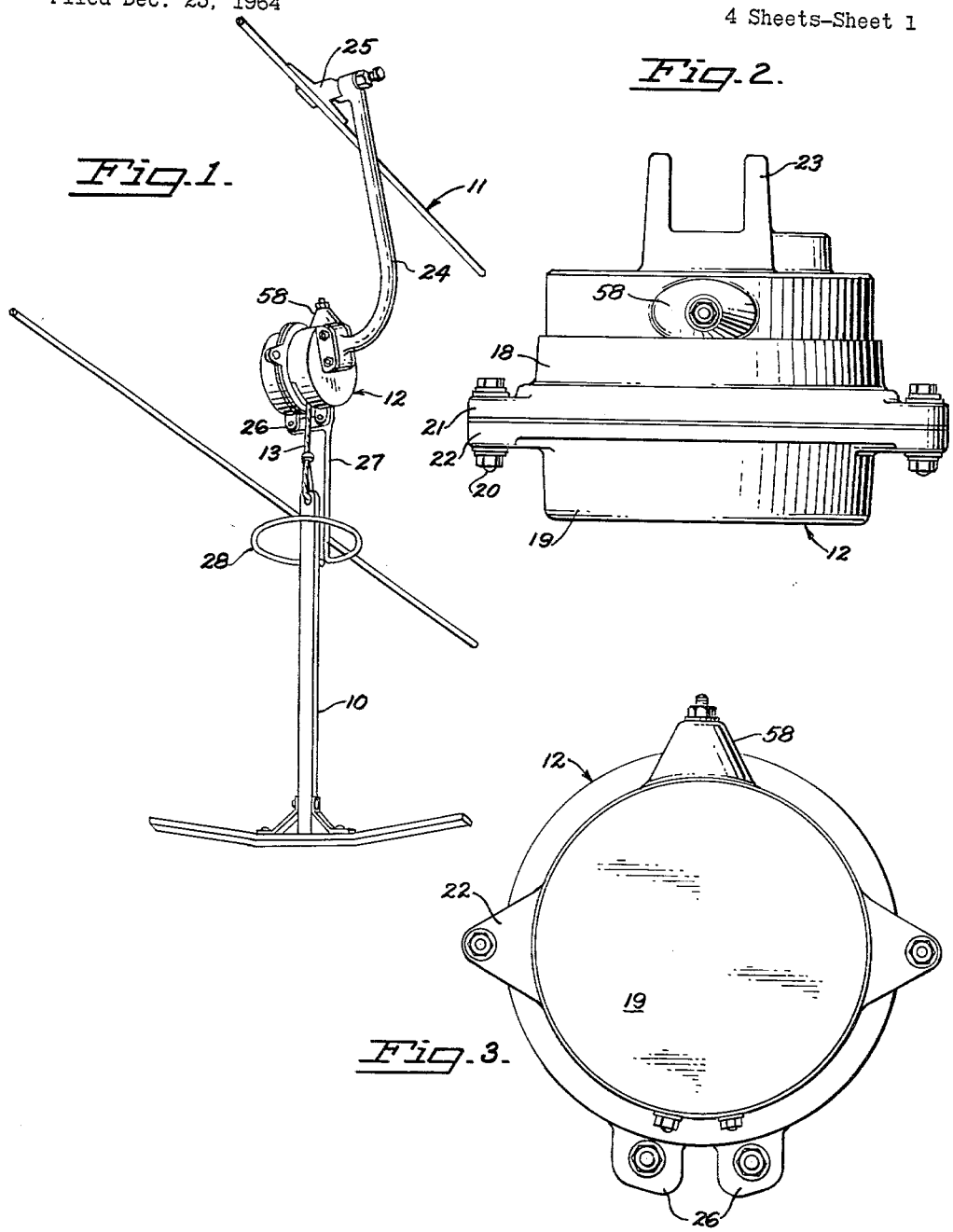

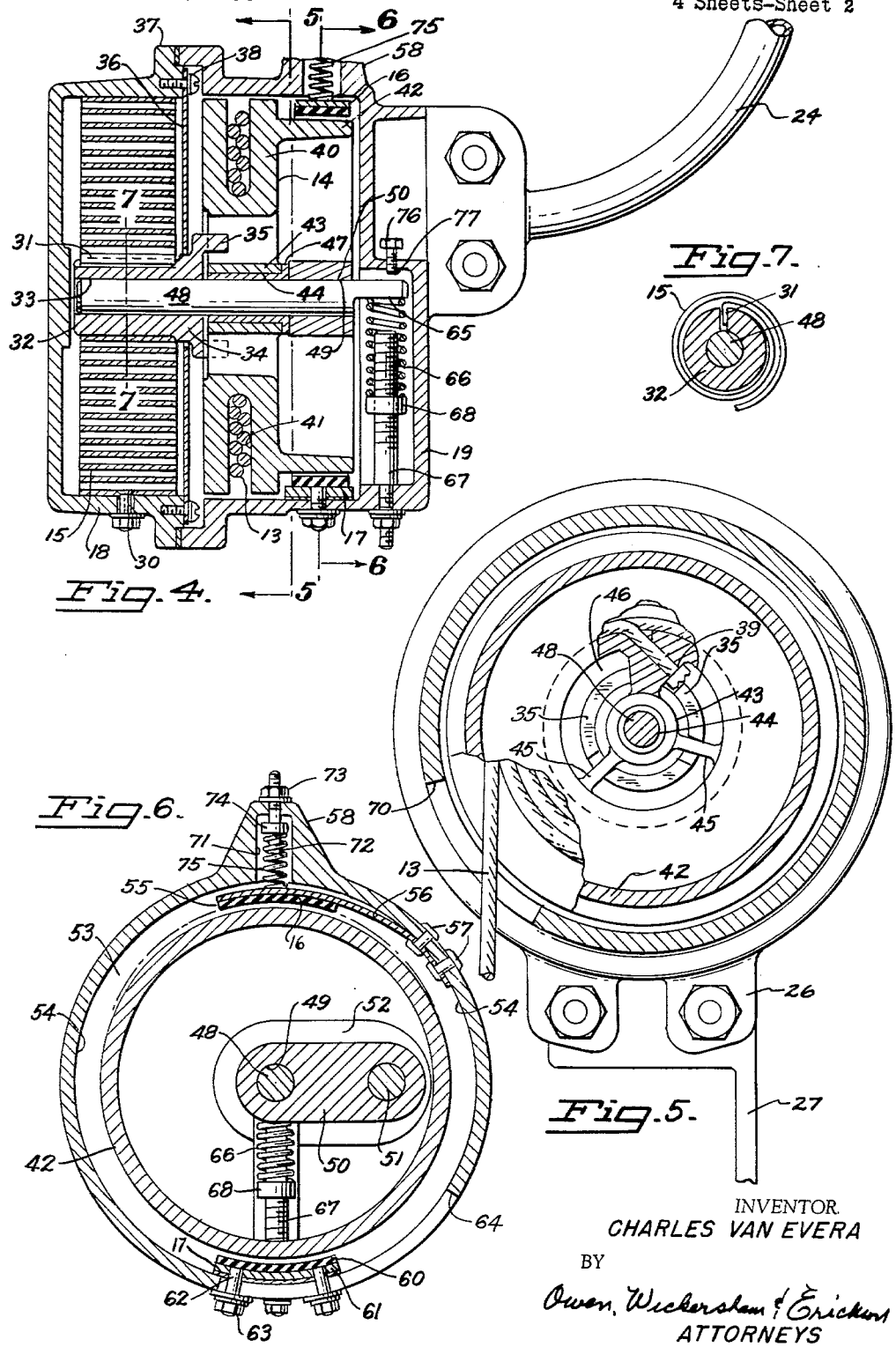

C. VAN EVERA 3,237,878

SPRING REEL

Filed Dec. 23, 1964

INVENTOR.
CHARLES VAN EVERA
BY
Owen, Wickersham Erickson
ATTORNEYS

March 1, 1966  C. VAN EVERA  3,237,878
SPRING REEL
Filed Dec. 23, 1964  4 Sheets-Sheet 4
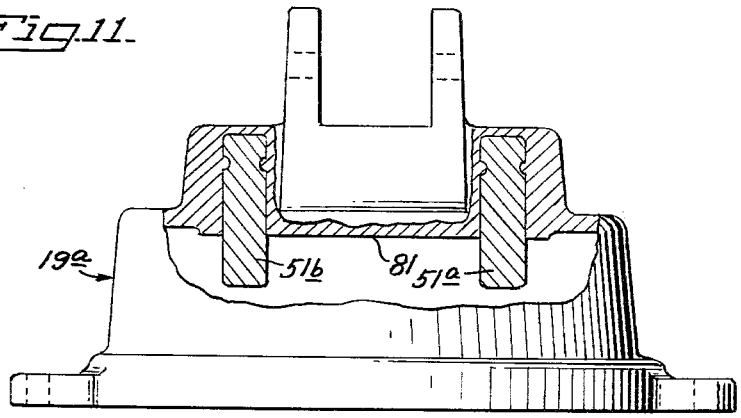
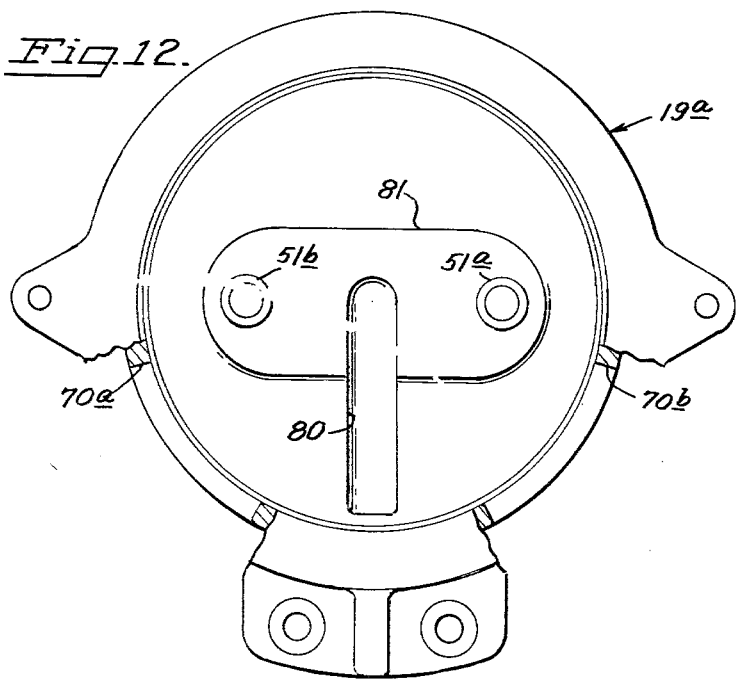
INVENTOR.
CHARLES VAN EVERA
BY
*Owen, Wickersham & Erickson*
ATTORNEYS United States Patent Office 3,237,878
Patented Mar. 1, 1966

3,237,878
SPRING REEL
Charles Van Evera, 103 Tapia Drive,
San Francisco, Calif.
Filed Dec. 23, 1964, Ser. No. 423,899
23 Claims. (Cl. 242—107.3)

This invention relates to a springbox for connecting a passenger transporting device to the overhead main transmission cable of a ski-lift. More particularly, this invention involves a springbox with a novel type of braking mechanism for regulating the speed of rotation of the cable reel both as it lets out and reels in the tow cable which connects the springbox to its passenger conveying device. This application is a continuation-in-part of my copending application Serial No. 272,380, filed on April 11, 1963.

In T-bar, J-bar and platter pull ski-lifts containing an endless main transmission cable circulating on pulleys that are suspended from a series of towers, and a number of passenger transporting devices shaped like an inverted T, a J, or a "platter" attached at spaced intervals to this cable in such a way that they can be extended from the cable and then retracted back to their rest position close to the cable, a device called a springbox is often used as part of the connection between the main transmission cable and the transporting device to provide this extendable-retractable feature. This springbox generally comprises a rotatable reel around which is wound a secondary cable connecting the passenger transporting device to the reel, and a coil spring connected to the reel in such a manner that it constantly exerts a force against the reel tending to rotate it in the "reeling in" direction. Some sort of brake mechanism is usually included in the springbox, functioning to slow down and stop the reel as it rotates in the "reeling out" direction.

Although various types of springboxes have heretofore been used, they have several serious disadvantages. For instance, in one prior art springbox device the brakes for slowing and stopping the cable reel comprised a series of gears connecting the reel axle to a brake band which was gradually tightened against a brake drum as the cable was pulled out. This brake mechanism required frequent adjustment to keep it functioning properly. In operation, the brake mechanism actually stopped the reel from turning when a certain amount of cable had been let out, so that as the depth of the snow varied, thus changing the distance between the springbox and the ground level, this brake required adjustment so that the proper amount of cable was let out before the brake stopped the reel. Another type of reel brake heretofore used was one that acted by centrifugal force developed as it rotated with the reel. This brake also required constant adjustment, particularly after it had been used for awhile and the brake lining was worn down somewhat. Furthermore, both of the aforesaid brakes easily became dirty as a result of wear of the moving parts, wear of the brake linings and oxidation of the metal of which the parts are constructed. This caused grabbing and sticking, and eventually a freezing up of the whole springbox. Such malfunctions then required shutting down the ski-lift, and also the services of maintenance personnel, both of which were expensive.

It is, therefore, an important object of my invention to provide an improved springbox with a reel brake that requires practically no adjustment even for a wide range of operational conditions, and hence one that rarely causes a shutting down of the ski-lift.

Another disadvantage inherent in the existing springboxes was that they were all relatively complicated mechanisms and contained a relatively large number of parts. Such devices were thus expensive to manufacture, as well as being more subject to malfunctions. Several of these parts, particularly in the gear type brake, required some machining, and thus were even more costly.

Another object of my invention is to provide a new type of springbox brake having fewer parts, and one which is, therefore, particularly well adapted for ease and economy of manufacture, and also one which is less likely to malfunction than existing springbox brakes.

One of the factors governing the capacity of a ski-lift is the amount of strain placed upon the main transmission cable. The weight of the springboxes carried by this cable constitutes a considerable strain, and thus plays a large part in establishing the capacity of the lift. The springboxes of the prior art all are quite heavy, mostly because of their numerous parts.

Thus, another object of my invention is to provide a new, lightweight springbox which reduces the strain on the transmission or tow cable and yet is at least equal in strength to these existing springboxes, its lightweight therefore allowing a measurable increase in the capacity of a lift.

Most of the springboxes heretofore used operated to brake the reel only in the reeling in direction. During the reeling out process there was either no braking at all or it was often erratic and required constant adjustment to prevent the skiers starting out from receiving a sudden jolt when the cable on the reel reached its full extension.

Accordingly, another object of my invention is to provide a novel springbox with a brake mechanism that constantly applies a smooth but firm braking force to the reel, both at it is rotating in the reeling out direction and the reeling in direction. Thus, my springbox enables all skiers to start out on the ski-lift with a smooth steady pull free from sudden jerks.

The aforementioned and other problems associated with the prior art springboxes are solved in my invention wherein the cable reel within the springbox housing is pivotally mounted and located adjacent a pair of internal braking members so that a braking action is automatically exerted on the reel in both the reeling in and reeling out directions. In the critical reeling out position the braking force automatically increases in proportion to the pull on the T-bar cable. During the reeling in process the brake means of my springbox operates to control the rate of retraction to the desired speed no matter what type of T-bar equipment is being used or how it is released. In either direction the cable reel rotates at a smooth uniform speed which reduces wear and tear on the springbox and its associated parts. The braking means within my springbox is relatively small and simple in construction, and thus weighs considerably less than the mechanical brake systems currently in use; this light weight reduces the strain on the main tow cable exerted by the springbox and increases the passenger capacity of the lift.

Other objects, features and advantages of my invention will become apparent from the following detailed description of a preferred embodiment, together with the accompanying drawings, in which:

FIG. 1 is a view in perspective showing a ski-lift springbox embodying the principles of the invention, attached to an overhead ski-lift transmission cable and supporting a T-bar passenger carrying device;

FIG. 2 is an enlarged view in side elevation of the springbox of FIG. 1;

FIG. 3 is another view in elevation of the springbox according to the invention and rotated 90° from the view of FIG. 2;

FIG. 4 is a view in side elevation and in section of the springbox of FIGS. 1–3;

FIG. 5 is a view in end elevation and in section taken along the line 5—5 of FIG. 4;

FIG. 6 is another view in end elevation and in section taken along the line 6—6 of FIG. 4;

FIG. 7 is a fragmentary view in section taken along the line 7—7 of FIG. 4;

FIG. 11 is a plan view of a housing member for the springbox shown in FIGS. 8 through 10 with portions broken away and shown in section;

FIG. 12 is a view in elevation showing the inside of the housing member of FIG. 11.

Figures 8, 9, 10:
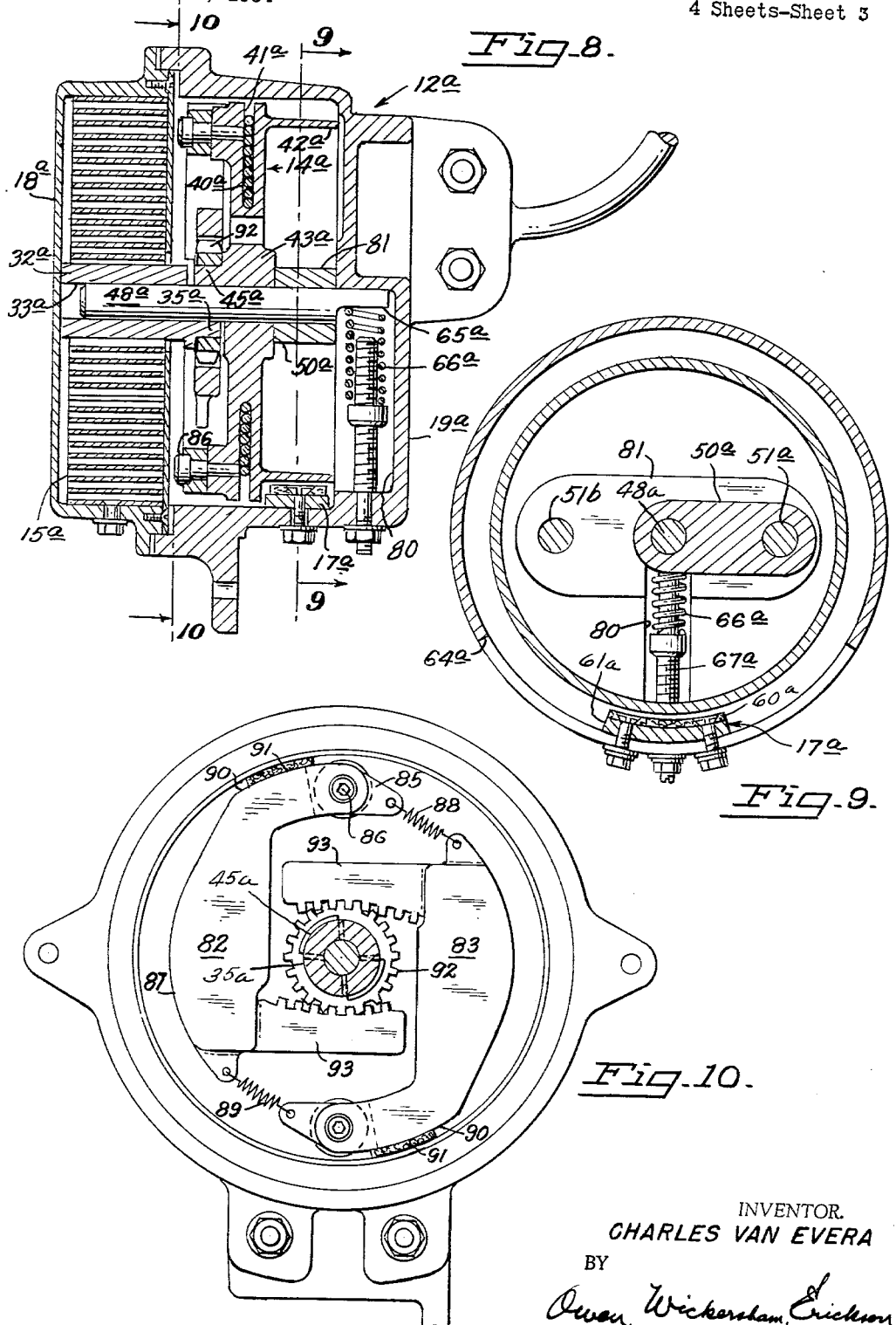
FIG. 8 is a view in side elevation and in section of a modified form of springbox embodying the principles of the invention.
FIG. 9 is a view in section taken along line 9—9 of FIG. 8.
FIG. 10 is a view in section taken along line 10—10 of FIG. 8.

In the drawings, FIG. 1 illustrates one of a number of passenger transporting devices 10 that are spaced apart on an endless transmission cable 11 of an overhead ski-lift or tow apparatus. As shown, the passenger transportation device 10 is the T-bar type and is connected to a springbox 12 by a flexible cable 13. In accordance with the principles of the invention, the springbox 12, as shown in FIGS. 4–6, comprises internally a cable reel 14 and a coil spring 15 which operates to exert a constant tension on the reel to retain the passenger transporting T-bar 10 in a retracted position when unloaded, while enabling the latter to be pulled downward from the main cable 11 under tension when passengers are to be loaded on it. Within the springbox 12 are provided a pair of spaced apart brake members 16 and 17 which serve to prevent the reel 14 from rotating at an excessive speed in either direction, thereby also preventing the T-bar device 10 from being extended downwardly from the main cable or retracted upwardly at too rapid a rate as passengers are loaded and unloaded.

As shown in FIGS. 2 and 3, the springbox 12 has a generally cylindrical external shape defined by a pair of cast housing members 18 and 19 that are held together by bolts 20 extending through aligned flanges 21 and 22 on opposite sides of both members 18 and 19. Extending axially on one side of the housing member 18 are a pair of integral projections 23 which form a bracket adapted to retain a curved arm 24 attached at its other end by a fitting 25 to the main ski-lift cable 11. At the lower end of the housing member 18 is another pair of integral projections 26 which are adapted to retain a downwardly extending bracket member 27 connected at its lower end to a suitable guide means 28, shown in FIG. 1 as a simple ring member. The guide ring 28 serves to prevent any excessive oscillatory movement of the T-bar 10 as it nears the springbox 12 during its retraction. Neither the guide ring 28 nor the supporting arm 24 form a part of the present invention and other forms thereof could be used with my springbox 12. Moreover, the springbox 12 itself could be utilized in many different types of installations other than the one shown in FIG. 1.

Describing now the internal mechanism of the springbox 12, shown in FIGS. 4–6, the coil spring 15 is retained within the housing member 18 with its outside end fixed thereto by a bolt or screw 30. The inside end 31 of the coil spring 15, as shown in FIG. 7, is retained in a longitudinal slot on a sleeve-like drive coupler 32. The drive coupler 32 has a central bore 33 and an enlarged portion 34 at one end with a series of axially extending projections or dogs 35 that provide a loose driving axial connection with the cable reel 14 located adjacent to the coil spring 15 and supported within the housing member 19. An annular cover plate 36 is attached by a series of screws 37 to an inner annular end surface 38 of the housing member 18 and it fits loosely around the sleeve 32 adjacent its enlarged end portion 34.

The cable reel 14 is mounted within the housing member 19 so that it will rotate freely about its own central axis, and its axis of rotation is also movable within the housing 19 so that when rotating it can engage either of the brake members 16 and 17. The reel itself has a cable storing portion 40 with an annular slot 41 or groove in which the flexible T-bar cable 13 is wound. Integral with the cable storage portion 40 of the reel 14 is a cylindrical brake portion 42 formed by an annular axially extending flange. The reel 14 has a hub portion 43 with a central bore 44 connected to the cable storing portion 40 by a series of spoke portions 45 between which are formed openings 46 to receive the driving projections 35 on the coupled sleeve 32 attached to the coil spring 15. The openings 46 in the hub portion 43 are sufficiently large so that the cable reel 14 can readily move to its upper and lower braking positions without interfering with the driving action of the projections 35. The cable 13 is fixed to the cable reel 14 through an opening 39 which retains the end of the cable in an opening 46. A bearing or bushing 47 is provided inside the hub member 43 having a smooth inner bearing surface.

The coil spring 15 and the cable reel 14 are interconnected within the housing members 18 and 19 by a central shaft 48 which extends through the bore hole 33 of the drive coupler 32 and the bushing 47 in the hub 43 of the cable reel 14. The shaft 48 also extends through a bore hole 49 of a movable link member 50 that is pivotally mounted within the housing member 19. At shown in FIG. 6, the link member 50 is rotatably connected to a pin member 51 which is fixed to an inner end wall 52 of the housing member 19.

The annular flange 42 forming the brake portion of the cable reel 14 is preferably radially aligned on the shaft 48 with the link member 50, and its outside diameter is such that an annular clearance 53 is formed between it and the inside surface of the annular wall 54 of the housing member 19 when the cable reel 14 is in the neutral position, as shown in FIG. 6.

Attached to the inner wall 54 of the housing member 19 are the brake members 16 and 17. The upper brake member 16 comprises a curved segment 55 of a composition material of the type commonly used for brake lining. It is bonded to a similarly curved backing plate member 56, preferably made of a resiliently flexible metal and attached at one end by bolt or rivet members 57 to the inner housing wall 54. The brake member 16 is thus movable radially within the space 53 between the reel flange 42 and the inner housing wall 54. Adjacent the brake member 16 is a boss like portion 58 of the housing member 19 that extends radially outwardly therefrom and has a bore 71. Threadedly engaged at the outer end of the boss 58 is a cylindrical member 72 that extends partially into the bore 71 and is provided with an adjustable lock nut 73 adapted to seat on the outer end of the boss 58. Attached to the member 72 within the bore is a collar 74 which serves as a seat for a spring 75 that extends beyond the member 72 and is attached to the backing plate member 56. The member 72 and its collar seat 74 can be adjusted within the boss 58 so that the spring 75 will cause the brake member 16 to exert the desired amount of force on the reel flange 42 and hence a constant braking action on the reel 14 during the reeling in process.

The lower brake member 17 also has a curved liner 60 bonded to a similarly curved backing plate 61 which has studs 62 or bolts that extend outwardly through the housing wall and are retained by tightening nuts 63. The studs 62 extend through a slot 64 in the housing member 19 so the brake member 17 can be adjusted to various positions along its periphery. This in effect provides a means to vary the lever arm of the force acting on the brake member 17 when the cable reel 14 pivots about the pin member 51, and its adjustment thus makes it possible to vary the frictional resistance or braking effect on the cable reel 14 for a given amount of pull on the flexible cable 13 as a T-bar or equivalent device 10 is pulled away from the springbox 12. For example, in FIG. 6, if the brake member 17 is moved along the housing wall toward the pin 51 supporting the link 50, the downward force on the brake means 17 resulting from the downward pull of the T-bar cable 13 would be increased over what it would be for the brake member 17 in the position now shown. The aforementioned is an important feature of the invention because it provides a substantial range of adjustability for smooth operation of the springbox under various conditions and it is mechanically simple and thus easy to manipulate.

At its end adjacent the brake portion 42 of the reel 14, the shaft 48 is cut away to form a flat horizontal seat 65 for one end of a spring 66 that is considerably larger than the spring 75 and constantly urges the cable reel 14 upward toward the upper brake member 16. The spring 66 is supported and held in alignment by a bolt member 67 fixed in the wall of the housing member 19. An axially adjustable nut 68 on the bolt 67 provides a seat for the lower end of the spring 66 and can be threaded along the bolt 67 to any position so as to provide the spring force necessary to urge the cable reel 14 upwardly with the proper force against the brake member 16 during retraction of the cable reel 14. The upward travel of the reel 14 is limited within the housing 19 by a set screw 76 that is threaded through a transverse portion 77 of the housing directly above the end of the shaft 48, as shown in FIG. 4. The screw 76 requires only one initial setting and once set to its proper position within the walls of the housing it prevents any contact by the reel 14 with inner walls of the housing.

The flexible cable 13 extends from the housing member 19 through a slot 70 in the housing wall 54 and as shown in FIG. 5, the slot is sufficiently long so that the cable 13 will not interfere with the housing member 19 when the T-bar device 10 is extended normally from the springbox 12.

In operation, the springbox 12 provides a constant spring windup force on the T-bar passenger device 10 that is sufficient to keep it fully retracted when not in use. Yet because of the stationary brake members 16 and 17 and the pivotal cable reel 14, a braking force is provided automatically both when the T-bar device 10 is pulled downwardly from the main cable 11 or when it is released and retracted toward the springbox 12 as the passengers are unloaded. During extension of the passenger device 10, the force on the cable 13 causes the cable reel 14 to pivot downwardly within the housing away from the braking member 16 so that the rotating braking flange portion 42 engages the braking member 17. The force with which the rotating flange portion 42 engages the brake member 17 is entirely due to the amount of pull on the cable 13 because the force of spring 66 tending to move the reel upwardly is relatively small. Thus, when the cable 13 is reeled out, a braking force will result which is directly proportional to the pull-out force applied to the cable 13, and this is a highly beneficial feature because no matter what the size or weight of the skier pulling on the cable 13 the braking force produced will be just enough to permit a smooth start up without any sudden jerk. The harder the pull on the T-bar 10 the more braking occurs, and with the adjustment of the brake member 17 properly made, the cable reel 14 will reel out at just the desired rate. With the springbox 12, when the T-bar is released, the spring 66 urges the cable reel upwardly against the set screw stop 76 at which point the brake member 16 engages the reel flange 42 with a predetermined force controlled by the preset spring 75. Therefore, even though the T-bar device is completely free when released, it will retract upwardly at a smooth steady and safe rate with a minimum of oscillation.

A somewhat modified springbox 12a embodying principles of my invention is shown in FIGS. 8 through 12. In this embodiment, the braking of the cable reel during the pull-out of the cable is accomplished in exactly the same manner and with the same combination of elements as with the springbox 12, as previously described. However, braking during retraction of the cable is accomplished by a centrifugal type braking means. As shown in FIGS. 9 and 10, the exterior appearance of the springbox 12a may be essentially the same as that of the springbox 12. Within a pair of housing members 18a and 19a a coil spring 15a is retained at its inner end on a drive coupler 32a, and its outer end is fixed to the housing member 18a. The drive coupler has a central bore 33a and is connected by means of a plurality of axially extending dog members 35a to a hub portion 43a of the cable reel 14a having similar interconnecting dog members 45a, as shown in FIGS. 8 and 9.

The cable reel 14a may be similar to cable reel 14 except that I may provide a cable storing portion 40a having a relatively narrow annular slot 41a which is only slightly wider than the diameter of the standard T-bar cable 13. Integral with the cable storage portion 40a of the reel 14a is a cylindrical brake drum portion 42a in the form of an axially extending flange. This portion of the springbox 12a is identical in structure and function to that of the springbox 12, as previously described, and cooperates in the same manner with a brake member 17a fixed in the housing wall to provide braking for the cable reel 14a when the cable is pulled out.

The cable reel 14a and the connected drive coupler 32a to which is attached the spring 15a are both rotatably supported on a shaft 48a which is movable within the springbox 12a relative to its housing in a manner similar to that of the shaft 48. The shaft 48a is cylindrical except for a notched out semicylindrical end portion forming a flat seat 65a along its longitudinal axis. This latter end portion of the shaft fits within an internal vertical groove 80 within the housing member 19a, as shown in FIG. 12. The upper end of the groove 80 is rounded to receive the outer curved surface of the notched out end of the shaft, and thereby limits its upward travel. A spring 66a within the groove 80 engages the seat 65a of the shaft 48a and constantly urges it towards the upper end of the groove 80. When the shaft 48a is seated at the upper end of the groove 80, the cable reel 14a is centered within the housing and does not move upward beyond this central position to accomplish braking during cable windup, as with the previous embodiment.

The housing member 19a, preferably cast as an integral unit from some suitable material such as an aluminum alloy, and as shown in FIG. 11, is formed with a relatively thick central boss portion 81 that extends horizontally across the inside of the member 19a. The groove 80 is centrally located within the boss portion 81 and spaced apart an equal distance from the groove central axis are a pair of fixed shaft members 51a and 51b. The latter are preferably embedded in the housing member 19a when it is cast. A link member 50a is rotatably connected to either one of the latter shafts at one end, and to the shaft 48a supporting the cable reel 14a at its other end. Therefore, when a pull-out force is applied to the cable 13a, the cable reel 14a will move downwardly within the housing as it rotates, and its drum portion 42a will engage the fixed brake member 17a located on the inner surface of the housing member 19a as in the previous embodiment. The brake member 17a comprises a curved shoe or liner 60a bonded to similarly curved backing plate 61a, as shown in FIG. 9.

In the springbox 12a, the spring reel 14a is preferably provided with conventional means (not shown) for securing the end of the cable 13a so that it can be wound thereon in either a clockwise or counterclockwise direction. Thus, the springbox 12a can be assembled so that the cable 13a will extend from either one side or the other of the housing 19a. This is an important feature because with various ski-tow or other passenger transporting installations the requirements of clearance and accessibility can vary, and, accordingly, it is necessary that the cables exit from the springboxes on one particular side.

The spring reel 12a solves this latter problem and can be assembled for windup in either the clockwise or counterclockwise direction, depending on whether the link member 50a is connected to either the shaft member 51a or 51b. When the link member 50a is connected to the shaft member 51a, as shown in FIG. 12, the cable reel 14a will windup in the clockwise direction and the cable 13a will extend from the housing 19a through a slot 70a. However, when the link member is pivotally supported on the shaft member 51b, the cable reel will windup in a counterclockwise direction, as viewed in FIG. 12, and the cable will extend through a slot 70b on the opposite lower side of the housing. A similar range of adjustment for the brake member 17a to accommodate either clockwise or counterclockwise windup is made possible by another slot 64a which extends circumferentially an equal distance on opposite sides of the vertical centerline of the housing member 19a. The brake member 17a is adjustable in the manner previously described to any position within the slot 64a, depending on the windup position of the cable reel and the amount of pull-out braking force required.

After the release and during windup of the cable, the braking of the cable reel 14a in the springbox 12a is accomplished by a pair of centrifugally actuated braking members 82 and 83 which are pivotally connected to the inner face of the cable reel. As stated previously, the end of the shaft 48a during the windup phase is pushed upward by the spring 66a and is seated at the upper end of the lot 80. This prevents the cable reel drum portion 42a from engaging any upper brake shoe as in the windup braking system for the springbox 12, and instead the braking is accomplished by the braking members 82 and 83.

As shown in FIG. 10, the braking members 82 and 83 are generally angular in shape and each is pivotally retained near one relatively narrow end portion 85 by means of a machine bolt 86 which is threadedly secured to the face of the cable reel near its periphery. The portion 87 of each braking member at the end opposite from its pivotal connection is enlarged in width and, therefore, has a substantial weight. The braking members lie on the face of the cable reel with the enlarged end portions 87 spaced apart from the pivoted end portions 85, and these opposite ends are connected by spring members 88 and 89 which constantly tend to pull the braking members together. An outer edge 90 on each braking member on its narrow end portion 85 near its retaining bolt 86 has substantially the same curvature as the adjacent inner surface of the housing, and to this curved edge is fixed a braking shoe 91 of some suitable braking composition such as the brake liner material 60a on the braking member 17a.

As the cable reel 14a rotates during windup, the centrifugal force of the braking members 82 and 83 overcomes the force of the spring members 88 and 89 and they move radially outwardly while pivoting about the bolts 86. In moving a slight distance outwardly, the braking shoes 91 frictionally engage the inner cylindrical housing wall, thereby providing braking force that controls the rotational speed of the cable reel. As the cable reel slows down, the spring members 88 and 89 tend to pull the braking members together, eventually disengaging the braking shoes 91 from the housing wall. To assure that the braking members move outwardly and inwardly in unison and thereby provide a balancing braking force on opposite sides of the cable reel, I may provide an equalizing gear member 92 having teeth which mesh with similar teeth on arms 93 projecting inwardly from the braking members 82 and 83, as shown in FIG. 10. This gear member 92 is mounted for free rotation on the hub of the cable reel 14a, and as it rotates in one direction the arms 93 being meshed therewith are forced to move in opposite directions at the same rate. This assures that the brake members move outwardly at the same rate and thus engage the housing with equal pressure and at the same instant.

The operation of the springbox 12a is exactly the same as that of the springbox 12 with respect to the pull-out braking system. That is, the downward pull on the cables causes the cable reel 14a and the shaft 48a to move downwardly as the linking member 50a pivots about the fixed shaft (51a or 51b). This enables the braking drum portion 42a of the cable reel to engage the lower braking member 17a with a force that is proportional to the pull-out force on the cable and thereby controlling the speed of the cable reel. When the cable 13a is released from the pulled out position and commences to windup, the shaft 48a moves upwardly by the spring 66a and seats at the upper end of the groove 80. As the cable reel rotates, the centrifugal braking members 82 and 83 move outwardly and cause a braking of the cable reel.

In the springbox 12a, the braking produced during the windup phase is most effective when the cable is first released, and this is a significant advantage because it overcomes the tendency for the apparatus, such as a T-bar or the like, to whip after being released. This tendency to whip normally arises because the winding spring has the greatest store of energy when the cable is first released, and since the diameter of the cable loop on the reel is relatively small, the reel has a relatively high rate of rotation. However, the increase in the reel speed produces a proportionately greater amount of centrifugal force, and thus a greater braking force by the members 82 and 83. Near the end of the cable windup, the cable reel slows down because the winding diameter of the cable within the slot is now greater, and also at this point the force of the winding spring has diminished. This reduces the centrifugal force and the total braking force being applied to slow the cable reel. The net effect is that braking force is never great enough to overcome the diminishing force of the windup spring and the cable reel will, therefore, wind the cable all the way up at a smooth rate after each release from the pull down position.

It will thus be seen that my novel springbox represents a substantial advance in the art because it requires practically no adjustment during normal operation; it is considerably lighter in weight than existing springboxes; it exerts a braking force on the moving cable in both the reeling in and the reeling out directions; it has far fewer parts, and particularly moving parts, and thus costs substantially less to manufacture; and it increases the capacity of ski-lifts upon which it is used by reducing the weight allotted to the springboxes.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A device for retaining an extendable cable comprising in combination:
    a housing;
    a rotatable cable reel within said housing;
    a cable attached at one end and wound on said reel with the other end extending outside said housing and attached to a passenger carrying means;
    a coiled spring within said housing drivingly engaged with and normally urging said reel to rotate about its central axis in one direction to keep said cable wound-up on said reel;
    means for mounting said reel within said housing about a pivotal axis spaced from its central axis;
    and a plurality of spaced apart stationary brake members fixed within said housing, one of said brake members being adapted to engage said cable reel when said reel is moved about its pivotal axis within said housing in response to tension on the cable;
    and means urging said cable reel into engagement with another said brake member when tension on said cable is removed, whereby the lineal rate of extension and retraction of said cable is automatically controlled within predetermined safe limits.

2. A device for retaining an extendable cable comprising in combination:
   a housing;
   a rotatable cable reel within said housing;
   a cable attached at one end and wound on said reel with the other end extending outside said housing;
   a coiled spring within said housing drivingly engaged with and normally urging said reel to rotate about its central axis in one direction to keep said cable wound-up on said reel;
   means for mounting said reel within said housing about a pivotal axis spaced from its central axis, said reel being thereby movable about its pivotal axis to engage a braking surface within said housing in response to tension on the cable;
   and means urging said cable reel into engagement with another braking surface within said housing when tension on said cable is removed, whereby the lineal rate of extension and retraction of said cable is automatically controlled within predetermined safe limits.

3. A device for retaining an extendable cable comprising in combination:
   a housing;
   a rotatable cable reel within said housing;
   a cable attached at one end and wound on said reel with the other end extending outside said housing and attached to a passenger carrying means;
   a coiled spring within said housing drivingly engaged with and normally urging said reel to rotate about its central axis in one direction to keep said cable wound-up on said reel;
   means for mouting said reel within said housing about a pivotal axis spaced from its central axis;
   and a pair of spaced apart brake members within said housing including a first brake member mounted on the inner wall of said housing adjacent said reel and adapted to engage said cable reel when it is moved about its pivotal axis within said housing in response to tension on the cable;
   and a second brake member yieldably mounted adjacent the inner wall of said housing on substantially the opposite side thereof;
   and means urging said cable reel into engagement with said second brake member when tension on said cable is removed, whereby the lineal rate of extension and retraction of said cable is automatically controlled within predetermined safe limits.

4. The device as described in claim 3 including means for adjusting the location of said first brake member on said housing relative to the pivotal axis of said cable reel, thereby varying the braking force thereon.

5. A springbox device for use on a ski-tow comprising in combination:
   a housing;
   a cable reel rotatable about its central axis and mounted within said housing;
   a cable attached at one end and wound on said reel with the other end extending outside said housing and attached to a passenger carrying means;
   a coiled motor spring within said housing;
   shaft coupler means fixed to said motor spring and drivingly engaged with said reel, and motor spring normally urging said reel to rotate in the direction to keep said cable wound-up thereon;
   means for pivotally supporting said reel about an offset axis spaced from and parallel to its central axis within said housing;
   and spaced apart brake means within said housing, said cable reel being adapted to engage one of said brake means when said reel is moved about its offset axis within the housing as the cable is pulled outwardly from said springbox;
   and means urging said cable reel against the other said brake means thereby automatically braking said cable reel and controlling the speed of retraction of said cable when the cable is released.

6. A springbox device for use on a ski-tow comprising in combination:
   a housing;
   a rotatable cable reel within said housing;
   a cable attached at one end to and wound on said reel with its other end extending outside said housing and attached to a passenger carrying means;
   a motor spring within said housing;
   shaft coupler means fixed to said motor spring and drivingly engaged with said reel, said motor spring normally urging said reel to rotate in the direction to keep said cable wound-up thereon;
   a central shaft supported in and forming the axis of rotation for said reel;
   means for pivotally supporting said reel within said housing about an offset axis parallel to and spaced from said shaft;
   and spaced apart brake means within said housing, said cable reel being adapted to engage one of said brake means when said reel is moved about its offset axis within the housing as the cable is pulled outwardly from said springbox;
   and compression means within said housing and engaging said shaft to urge said cable reel against another said brake means and thereby automatically braking said cable reel and controlling the speed of retraction of said cable when the cable is released.

7. The springbox device of claim 6 wherein said shaft coupler means has a plurality of axially extending and circumferentially spaced apart dog portions adapted to fit loosely into enlarged similarly spaced apart and substantially aligned recesses in the hub portions of said cable reel; whereby said cable reel is allowed a freedom of movement within said housing when pivoting about its offset axis to engage either of said brake means.

8. The springbox device of claim 6 wherein said brake means comprises a pair of curved brake members each having a surface layer of brake lining material, spaced apart and attached to the inside of said housing.

9. The springbox device of claim 8 including a partially circumferential slot in said housing and stud means on one said brake member extending through said slot and retained by nuts; whereby said brake member can be adjusted from outside said housing to a different position relative to the offset axis of said cable reel, thereby varying the amount of braking force thereon.

10. The springbox device of claim 8 including means for adjusting the force exerted by said compression means on said central shaft and thus the braking force on said cable reel when the cable is being retracted.

11. The device as described in claim 10 wherein said latter means comprises a supporting bolt member extending through the wall of said housing, a radially extending retaining member on said bolt member supporting one end of said compression spring, and means on said bolt for adjusting its position axially within the housing thereby controlling the position of said retaining member and the force of said compression spring.

12. A springbox device for retaining an extendable passenger carrying means on a ski-tow comprising in combination:
   a housing;
   a rotatable cable reel within said housing;
   a flexible cable wound on said reel with one end extending outside said housing attached to said passenger carrying means;
   motor spring means within said housing drivingly engaged with and normally urging said reel to rotate in one direction about its central axis to keep said cable wound on said reel;

means for pivotally mounting said reel within said housing about an axis parallel to but spaced from its central axis;

and a pair of spaced apart curved brake members mounted within said housing including a first brake member located on the lower inside of said housing so that when said cable reel pivots downwardly within the housing as the cable is pulled outwardly from said springbox, the first brake member will engage and control the rate of unwinding of said reel, and a second brake member located on the upper inside of said housing, and means within said housing urging said cable reel upwardly towards said second brake member, whereby when the passenger carrying means is released, said reel will pivot upwardly and engage said second brake member thereby automatically braking said cable reel and controlling the speed of retraction.

13. A springbox device for retaining an extendable passenger carrying means on a ski-tow comprising in combination:

a housing;

a floating shaft within said housing;

a cable reel rotatably mounted on said floating shaft extending through its central axis;

a flexible cable wound on said reel with one end extending outside said housing attached to said passenger carrying means;

motor spring means within said housing drivingly engaged with and normally urging said reel to rotate in one direction about said floating shaft to keep said cable wound on said reel;

a second shaft fixed to said housing and pivotally supporting said reel about an axis parallel to but spaced from said floating shaft;

and a pair of spaced apart curved brake members mounted on the inside wall of said housing and in line with said cable reel, including a first brake member located on the lower inside of said housing so that when said cable reel pivots downwardly within the housing as the cable is pulled outwardly from said springbox the first brake member will engage and apply a braking force to said reel, and a second brake member located on the upper inside of said housing, and compression spring means within said housing adapted to engage the end of said floating shaft and thereby urging said cable reel upwardly towards said second brake member, whereby when the passenger carrying means is released, said reel will pivot upwardly and engage said second brake member thereby automatically braking said cable reel and controlling the speed of retraction.

14. A springbox device for retaining an extendable passenger carrying means on a ski-tow comprising in combination:

a housing;

a cable reel rotatably mounted on a free shaft within said housing, an axial cylindrical portion of said reel having an outside diameter slightly less than the inside diameter of said housing;

a flexible cable wound on said reel with one end extending outside said housing attached to said passenger carrying means;

a motor spring within said housing;

shaft coupler means fixed to said motor spring and drivingly engaged with said reel and normally urging it to rotate in one direction about said free shaft to keep said cable wound on said reel;

means for pivotally supporting said reel within said housing about an axis parallel to but spaced from said free shaft;

and a pair of spaced apart brake members mounted within said housing including a first brake member located on the lower inside of said housing so that when said cable reel pivots downwardly within the housing as the cable is pulled outwardly from said springbox the first brake member will engage said reel and control the rate of unwinding thereof by a braking force substantially proportional to the pull on said cable, and a second brake member located on the upper side of said housing;

and compression spring means within said housing constantly urging said cable reel upwardly towards said second brake member, whereby when the passenger carrying means is released, said reel will pivot upwardly and engage said second brake member thereby automatically braking said cable reel and controlling the speed of retraction.

15. A springbox device for retaining an extendable passenger carrying means on a ski-tow comprising in combination:

a housing;

a rotatable cable reel within said housing;

a flexible cable wound on said reel with one end extending outside said housing attached to said passenger carrying means;

motor spring means within said housing drivingly engaged with and normally urging said reel to rotate in one direction about its central axis to keep said cable wound on said reel;

means for pivotally mounting said reel within said housing about an offset axis parallel to but spaced from its central axis;

a pair of circumferentially spaced apart brake members mounted within said housing including a first brake member located on the lower inside of said housing so that when said cable reel pivots downwardly within the housing as the cable is pulled outwardly from said springbox, the first brake member will engage and slow down said reel, and a second brake member mounted on the upper inside of said housing;

means within said housing urging said cable reel upwardly about said offset axis into engagement with said second brake member;

and means for biasing said second brake member inwardly against said cable reel at a predetermined pressure whereby when the passenger carrying means is released, said reel will pivot upwardly and engage said second brake member thereby automatically braking said cable reel and controlling the speed of retraction.

16. A springbox device for retaining an extendable passenger carrying means on a ski-tow comprising in combination:

a housing;

a rotatable cable reel within said housing;

a flexible cable wound on said reel with one end extending outside said housing attached to said passenger carrying means;

motor spring means within said housing drivingly engaged with and normally urging said reel to rotate in one direction about its central axis to keep said cable wound on said reel;

means for pivotally mounting said reel within said housing about an axis parallel to but spaced from its central axis;

a pair of brake members spaced apart circumferentially within said housing including a first brake member mounted on the lower inside of said housing so that when said cable reel pivots downwardly within the housing as the cable is pulled outwardly from said springbox, the first brake member will engage and slow down said reel, and a second brake member yieldably mounted on the upper inside of said housing;

stop means for limiting the upward movement of said cable reel toward said second brake member;

means within said housing urging said cable reel upwardly towards said second brake member and against said stop member when the passenger carrying means is released;

and spring means retained by said housing for pressing said second brake member against said cable reel a predetermined amount, thereby controlling its rotary speed and the rate of retraction of said cable.

17. A springbox device for retaining an extendable passenger carrying means on a ski-tow comprising in combination:

a housing;

a rotatable cable reel within said housing;

a flexible cable wound on said reel with one end extending outside said housing attached to said passenger carrying means;

motor spring means within said housing drivingly engaged with and normally urging said reel to rotate in one direction about its central axis to keep said cable wound on said reel;

means for pivotally mounting said reel within said housing about an offset axis parallel to but spaced from its central axis;

a pair of circumferentially spaced apart brake members mounted within said housing including a first brake member located on the lower inside of said housing so that when said cable reel pivots downwardly within the housing as the cable is pulled outwardly from said springbox, the first brake member will engage said reel and exert a braking force proportional to the pull on the cable, and a second brake member mounted on the upper inside of said housing, and a first compression spring means within said housing urging said cable reel upwardly about said offset axis and into engagement with said second brake member;

and a second compression spring means smaller than said first compression spring means, retained by said housing and connected to said second brake member;

whereby when the passenger carrying means is released, said reel will pivot upwardly and engage said second brake member thereby automatically braking said cable reel and controlling the speed of retraction.

18. The device as described in claim 17 including means for adjusting the amount of pressure applied by said second compression spring means and said second brake member against said cable reel during the retraction of the cable.

19. A device for retaining an extendable cable comprising in combination:

a housing;

a rotatable cable reel within said housing;

a cable attached at one end and wound on said reel with the other end extending outside said housing;

a coiled spring within said housing drivingly engaged with and normally urging said reel to rotate about its central axis in one direction to keep said cable wound-up on said reel;

means for mounting said reel within said housing about a pivotal axis spaced from its central axis of rotation, said reel being thereby movable about its pivotal axis within said housing to engage a braking surface in response to a pull-out tension on the cable;

and means for braking said cable reel when tension on said cable is removed and said coiled spring drives said cable reel to wind up said cable, whereby the lineal rates of extension and retraction of said cable when it is first pulled out and when it is then released and wound up are both automatically controlled.

20. A device for retaining an extendable cable comprising in combination:

a housing;

a rotatable cable reel within said housing;

a cable attached at one end and wound on said reel with the other end extending outside said housing;

a coiled spring within said housing drivingly engaged with and normally urging said reel to rotate about its central axis in one direction to keep said cable wound-up on said reel;

means for mounting said reel within said housing about a pivotal axis spaced from its central axis of rotation, said reel being thereby movable about its pivotal axis within said housing to engage a braking surface in response to a pull-out tension on the cable;

and pivotal brake means on said cable reel for engaging the inside wall of said housing and thereby slowing the rate of rotation of said cable reel when tension on said cable is removed and said coiled spring drives said cable reel to wind up said cable, whereby the lineal rate of extension and retraction of said cable when it is first pulled out and when it is then released and wound up are both automatically controlled.

21. A device for retaining an extendable cable comprising in combination:

a housing;

a rotatable cable reel within said housing;

a cable attached at one end and wound on said reel with the other end extending outside said housing and attached to a passenger carrying means;

a coiled spring within said housing drivingly engaged with and normally urging said reel to rotate about its central axis in one direction to keep said cable wound-up on said reel;

means for mounting said reel within said housing about a pivotal axis spaced from its central axis;

a first brake member mounted on the inner wall of said housing adjacent to and engaged by said reel when it is moved about its pivotal axis within said housing in response to tension on the cable;

a pair of second brake members pivotally mounted on the face of said cable reel and movable outwardly due to centrifugal force when said cable reel rotates;

and brake shoe means on each said second brake member engageable with the inner wall of said housing, said second brake members being actuated automatically when tension on said cable is removed and said cable reel rotates to wind up the cable;

whereby the lineal rate of extension and retraction of said cable is automatically controlled within predetermined safe limits.

22. The device as described in claim 21, including an inwardly projecting arm on each of the second brake members, each said arm having a series of gear teeth, and an equalizer gear rotatably mounted on said cable reel and having teeth meshed with the teeth of both of said arms, whereby said second brake members are caused to move outwardly from the axis of said cable reel at an equal rate.

23. A springbox device for use on a ski-tow comprising in combination:

a plurality of connectable housing members;

a rotatable cable reel within a first said housing member having a slot extending radially outwardly from its central axis;

a cable attached at one end to and wound on said reel with its other end extending outside said first housing member and attached to a passenger carrying means;

a motor spring within said housing;

shaft coupler means fixed to said motor spring and drivingly engaged with said reel, said motor spring normally urging said reel to rotate in the direction to keep said cable wound-up thereon;

a central shaft rotatably supporting said reel and having one end within said slot in said first housing member;

a pair of fixed shaft members located at equally spaced apart distances on opposite sides of said slot in said first housing member, and link means connecting one of said fixed shaft members and said central shaft, thereby pivotally supporting said reel within said housing, said link means being connected to the other of said shaft members when it is desired for said cable reel to rotate in the opposite direction during pull-out and windup;

a brake means within said housing engaged by said cable reel when said reel is moved about a said fixed shaft member within said first housing member when the cable is pulled outwardly from said springbox; and means on said cable for engaging the inner wall of said first housing member and thereby automatically braking said cable reel and controlling the speed of retraction of said cable when the cable is released.

References Cited by the Examiner

UNITED STATES PATENTS

| | | | |
|---|---|---|---|
| 2,133,551 | 10/1938 | Logan | 242—107.3 |
| 2,584,559 | 2/1952 | Dalrymple | 242—107.3 |
| 2,594,484 | 4/1952 | Nixon | 254—152 |

MERVIN STEIN, *Primary Examiner.*